United States Patent [19]

Stith, Jr.

[11] Patent Number: 4,592,532
[45] Date of Patent: Jun. 3, 1986

[54] EXPANSIBLE SUPPORT AND METHOD OF USE

[76] Inventor: M. Randall Stith, Jr., R.R. #1, Box 13, Webster, Ky. 40176

[21] Appl. No.: 551,574

[22] Filed: Nov. 14, 1983

[51] Int. Cl.⁴ .............................................. B66F 3/24
[52] U.S. Cl. ................................... 248/649; 248/678; 248/188.2; 52/743; 52/126.5; 254/93 R; 411/539
[58] Field of Search ............... 248/649, 676, 677, 678, 248/188.2, 188.1, 637; 52/126.1, 126.3, 126.5, 743, 744; 254/93 R; 264/45.2; 411/539, 540, 541

[56] References Cited

U.S. PATENT DOCUMENTS

| | | | |
|---|---|---|---|
| 1,752,101 | 3/1930 | Meutsch | 254/93 R |
| 2,226,201 | 12/1940 | Freyssinet | 52/126.5 |
| 2,480,477 | 8/1949 | Jones . | |
| 3,190,041 | 6/1965 | Kimball | 52/744 |
| 3,194,853 | 7/1965 | Wiese | 52/744 |
| 3,276,181 | 10/1966 | Gilbert | 411/539 |
| 3,432,098 | 3/1969 | Sato . | |
| 3,604,306 | 9/1971 | Denholm . | |
| 3,622,072 | 11/1971 | Matsubara | 52/744 |
| 3,695,562 | 10/1972 | Daniel | 248/667 |
| 3,978,574 | 9/1976 | Stith, Jr. | 29/407 |
| 4,046,354 | 9/1977 | Stith, Jr. | 254/93 |
| 4,100,714 | 7/1978 | Stith, Jr. | 52/741 |
| 4,173,329 | 11/1979 | Stith, Jr. | 254/93 |

FOREIGN PATENT DOCUMENTS 718958  11/1954  United Kingdom ............... 411/539

Primary Examiner—J. Franklin Foss
Assistant Examiner—Robert A. Olson
Attorney, Agent, or Firm—Senniger, Powers, Leavitt and Roedel

[57] ABSTRACT

An expansible support for supporting a heavy industrial machine or the like on a foundation. The support comprises base and support members engageable with the foundation and machine, respectively, and an expansible annular member connecting the base and support members and defining an enclosed expansible chamber therebetween. Pressurized fluid is pumped into this chamber via an inlet port to expand the support to bring the base and support members into load-bearing engagement with the machine and foundation. The annular member is designed to permit the base and support members to move out of parallel with respect to one another for full face-to-face contact with nonparallel surfaces on the foundation and machine.

A method of using a plurality of such expansible supports to support a heavy industrial machine or the like is also disclosed.

10 Claims, 9 Drawing Figures

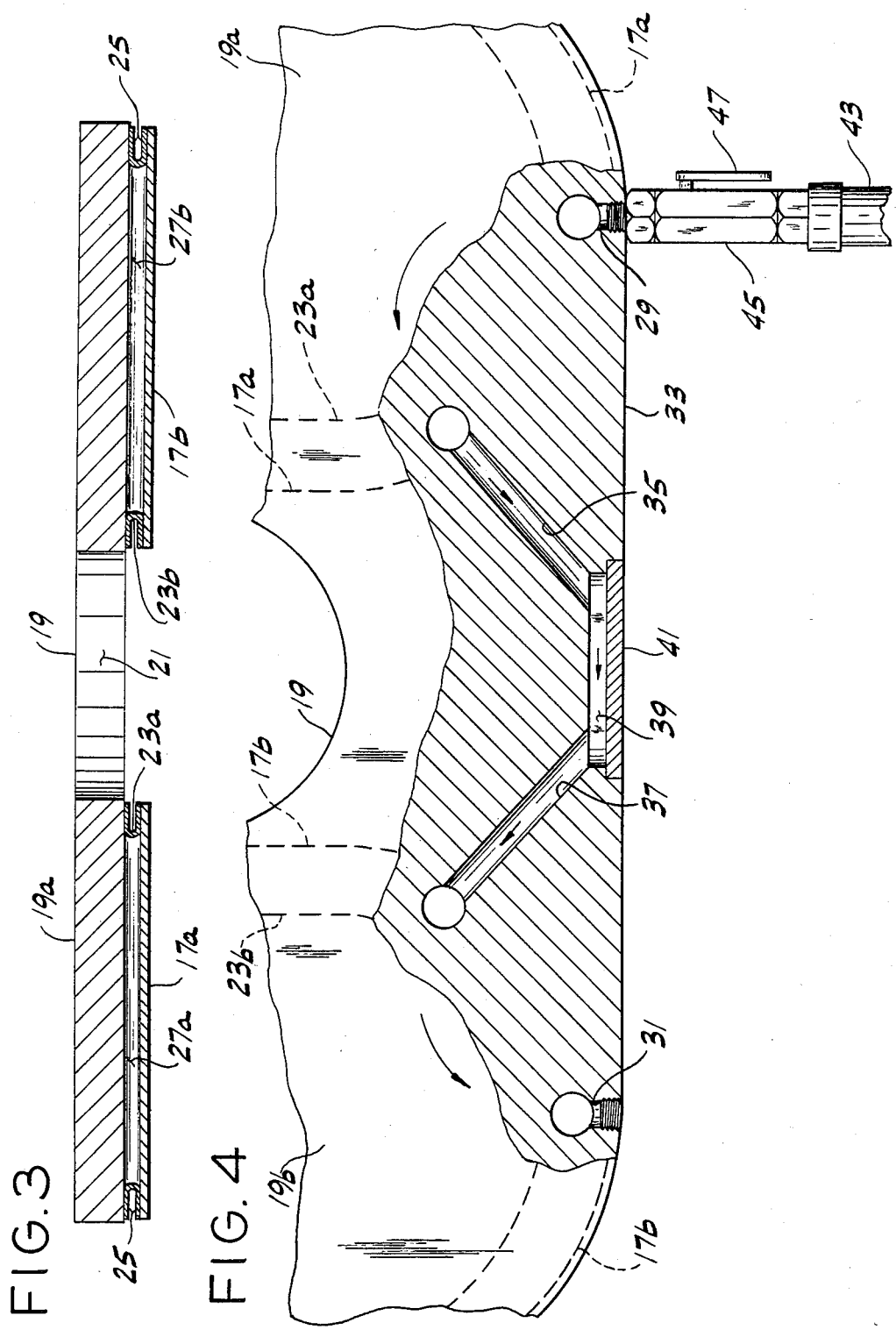

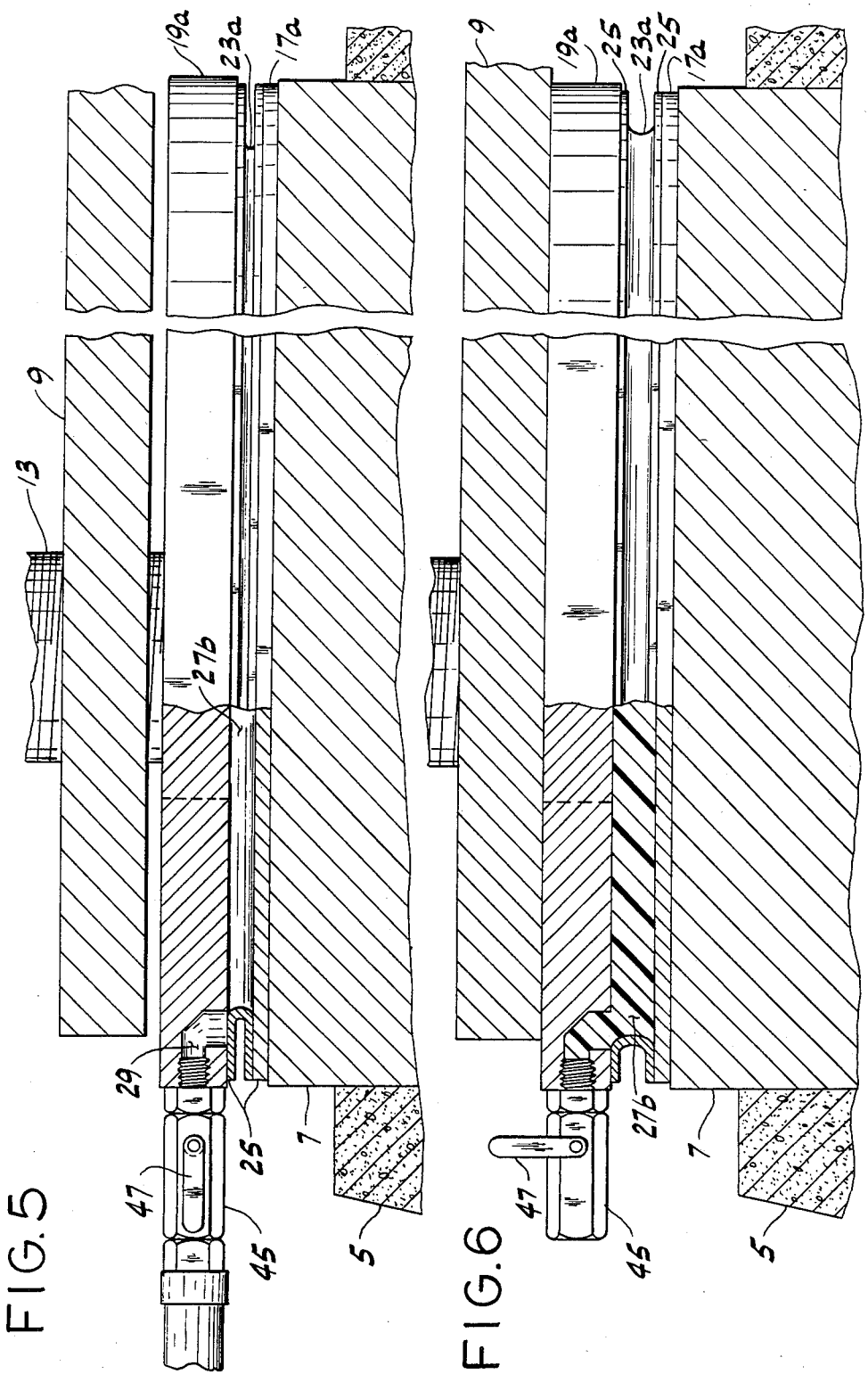

EXPANSIBLE SUPPORT AND METHOD OF USE

BACKGROUND OF THE INVENTION

This invention relates generally to a method of and device for supporting a heavy industrial machine or the like on a foundation, particularly on a foundation comprising a series of rigid structural members such as steel I-beams or flat metal bars commonly referred to in the trade as "rails".

Various techniques have been used for initially installing and aligning large industrial machines (e.g., compressors) on foundations and for remounting and realigning such machines on their foundations. My U.S. Pat. Nos. 3,978,574, 4,046,354, 4,100,714 and 4,173,329 describe several such improved techniques. However, while these patented techniques have proven highly successful, their use has been limited to applications involving concrete foundations.

In applications where a machine is to be "skid-mounted" on a series of spaced-apart parallel I-beams, or "rail mounted" on a series of spaced-apart parallel flat metal rails, it has heretofore been common practice to install precision-machined shims or chocks between the beams or rails and the mounting flanges of the machine to support the machine in proper position. However, these precision-machined shims are costly and time-consuming to make and install. More importantly, the top bearing surfaces of the beams or rails are often warped and thus out of parallel with the opposing bearing surfaces on the machine. As a result the shims or chocks are often not in full face-to-face contact with the foundation and machine surfaces, with the consequent effect that the shims tend gradually to creep from their proper positions while the machine is operating. This of course throws the machine out of alignment and necessitates shut-down and remounting of the machine.

SUMMARY OF THE INVENTION

Among the several objects of this invention may be noted the provision of an improved support for and method of accurately supporting a heavy industrial machine or the like in a precise position; the provision of such a support and method which are especially suited for "skid mounting" and "rail mounting" applications; the provision of such a support and method which provide for the solid and stable mounting of a machine on its foundation even if the opposing bearing surfaces of the machine and foundation are out of parallel; the provision of such a support and method which substantially reduce the cost and the down-time required to align or realign a machine; and the provision of such a support and method which do not require that a machine be removed from its existing foundation for resetting of the machine.

Generally, an expansible support of this invention for supporting a heavy industrial machine or the like comprises at least one base member having a substantially planar bottom face adapted for face-to-face engagement with a generally flat upwardly facing bearing surface on the foundation, a support member above the base member having a substantially planar top surface adapted for face-to-face engagement with a generally flat downwardly-facing bearing surface on the machine, an annular member connecting the base and support members, the annular member being expansible for permitting relative movement of the support member away from the base member, the annular member, base member and support members combining to define an enclosed expansible chamber, and an inlet port communicating with the expansible chamber for delivery thereto of fluid under pressure. The device is adapted to be positioned between the aforesaid foundation and machine bearing surfaces with the bottom face of the base member resting on the foundation bearing surface and to have fluid then introduced under pressure via the inlet port into the expansible chamber whereupon the annular member is adapted to expand and the support member to move upwardly relative to the base member thereby to bring the top and bottom faces of the respective members into load-bearing contact with said bearing surfaces, the annular member being adapted for permitting the top and bottom faces of the respective base and support members to move out of parallel with respect to one another for full face-to-face contact with nonparallel bearing surfaces. In one aspect of the invention, the base member is adapted for bending to conform to irregularities in the foundation bearing surface.

In another aspect of the invention, the aforementioned annular member has an annular wall which, in vertical section, is bent inwardly generally into the shape of a U. When fluid is introduced under pressure via the inlet port into the expansible chamber, the annular wall is adapted to expand and the support member to move upwardly to bring the top and bottom faces of the respective base and support members into load-bearing contact with respective bearing surfaces of the foundation and machine.

In a third aspect of the invention, the support of the present invention comprises a pair of base members having substantially planar bottom faces adapted for face-to-face engagement with a generally flat upwardly facing bearing surface on the foundation, a single support member above the base members having a substantially planar top face adapted for face-to-face engagement with a generally flat downwardly-facing bearing surface on the machine, an annular member connecting each base member and the support member, the annular members being expansible for permitting relative movement of the support member away from respective base members, the annular members, base members and support member combining to define a pair of enclosed expansible chambers, and inlet port means communicating with the aforesaid expansible chambers for delivery thereto of fluid under pressure. The support is adapted to be positioned between the foundation and machine bearing surfaces with the bottom faces of the base members resting on the foundation bearing surface and to have fluid then introduced under pressure via said inlet port means into the expansible chambers whereupon the annular members are adapted to expand and the support member to move upwardly relative to the base members thereby to bring the top and bottom faces of the respective members into load-bearing contact with said bearing surfaces. The annular members are adapted for permitting the top and bottom faces of the respective base and support members to move out of parallel with respect to one another for full face-to-face contact with nonparallel bearing surfaces. The support member has a slot therein for receiving an anchor bolt when the support is placed between the foundation and the machine, the base members and associated annular members being connected to the support member on opposite sides of the slot.

A method of supporting a heavy industrial machine or the like on a foundation in a predetermined position above the foundation comprises the steps of:

(a) placing a series of temporary support members between said foundation and the machine at a plurality of different locations temporarily to support the machine spaced above the foundation at said predetermined position;

(b) removing the temporary support member at one location and placing a vertically expansible support between the foundation and the machine at that location;

(c) introducing a hardenable fluid under pressure into said support to expand the support vertically into load-bearing engagement with the machine and the foundation thereby to support the machine at said one location at said predetermined position;

(d) maintaining said fluid in the support under pressure until it hardens to fix the support in a position supporting the machine at said one location at said predetermined position; and (e) repeating steps b-d at each of said locations.

Other objects and features will be in part apparent and in part pointed out hereinafter.

BRIEF DESCRIPTION OF THE DRAWINGS

FIG. 3 is a vertical section on line 3—3 of FIG. 2;

FIG. 4 is an enlarged portion of FIG. 2 with portions broken away to illustrate passaging in the support;

FIG. 5 is an elevational view showing the support in its unexpanded condition positioned on a rail below a mounting flange of the machine, portions of the support being shown in section to illustrate details;

FIG. 6 is a view similar to FIG. 5 showing the support in its expanded condition supporting the machine on its foundation;

Corresponding reference characters indicate corresponding parts throughout the several views of the drawings.

DESCRIPTION OF A PREFERRED EMBODIMENT

Figure 1:
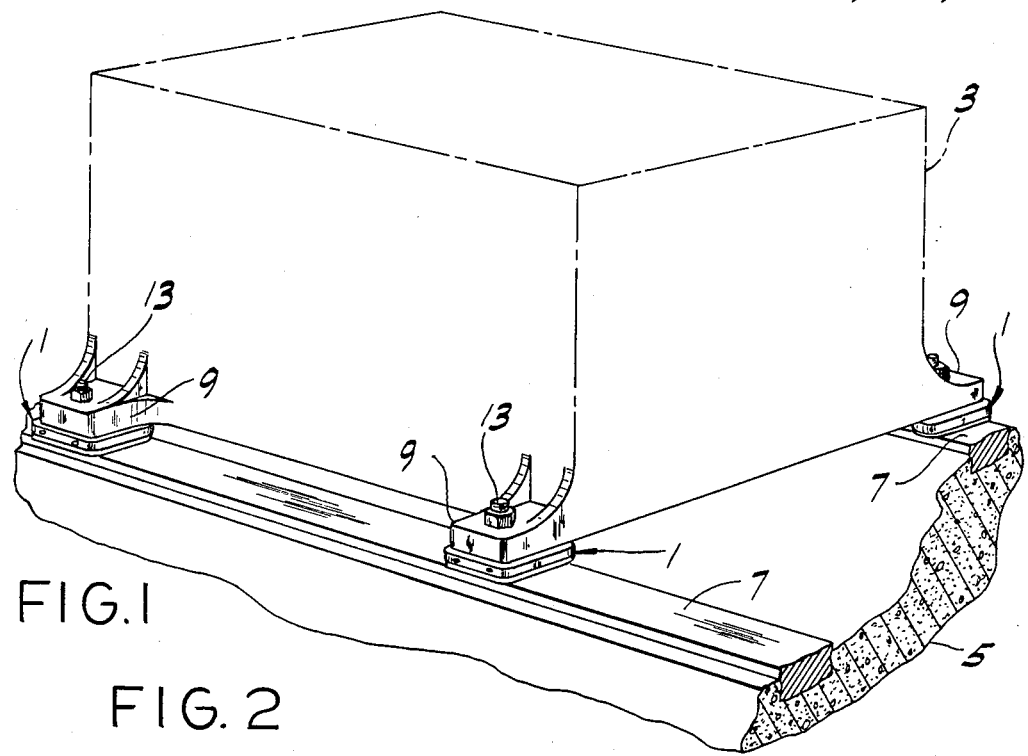
FIG. 1 is a perspective of an industrial machine (shown in phantom) accurately supported on a foundation by a plurality of expansible supports of the present invention.

Referring now to the drawings, and more particularly to FIG. 1, a plurality of expansible devices or supports, each designated in its entirety by the reference numeral 1, are shown supporting a heavy industrial machine 3, such as a large industrial air compressor, on a foundation 5. As illustrated, the foundation comprises a series of generally parallel flat metal rails 7 of rectangular-section bar stock embedded flatwise in concrete to a depth less than the thickness of the rails so that the flat upper surfaces of the rails are disposed above the concrete and lie in the same generally horizontal plane. The machine has a plurality of mounting flanges or feet 9 and is secured to the foundation by anchor bolts 13 which are embedded in the concrete and which project upwardly through holes in respective rails and mounting flanges. Nuts 15 threaded on the anchor bolts into engagement with the mounting flanges hold the machine in place on the foundation. The expansible supports 1 of this invention are positioned on the rails 7 immediately below respective mounting flanges 9 for supporting the machine spaced a relatively small distance (e.g., 1" or 2.5 cm.) above the rails, the gap between the machine and rails being provided for ventilation purposes.

The expansible supports 1 are adapted for supporting the machine in precise position or alignment, which is important where the machine is a large industrial air compressor, for example, to assure that the crankshaft of the machine is free of deflection and undesirable stresses. As will appear, the supports 1 are designed to stably support the machine in precise position even if the top faces of the rails 7 and the bottom faces of the mounting flanges 11 are out of parallel, which is typically the case inasmuch as the rails are often bent at least to some extent during the course of handling prior to being embedded in the concrete foundation.

Figure 2:
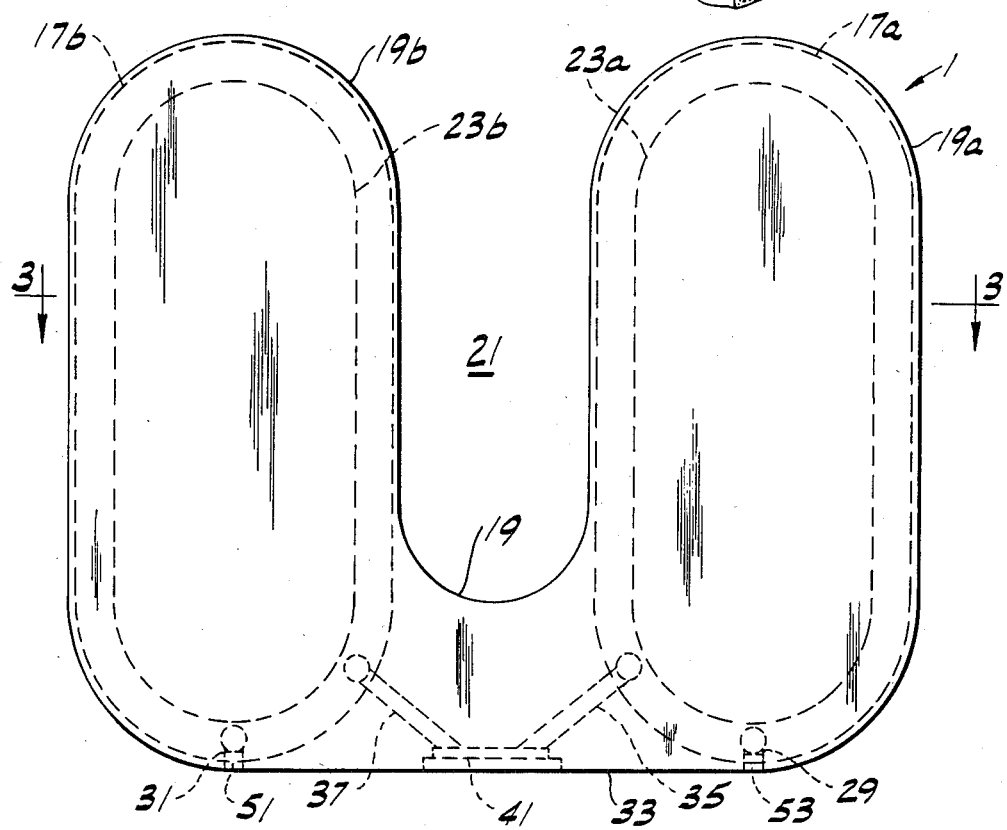
FIG. 2 is a top plan of a support.

FIGS. 2 and 3 show an expansible support 1 in its unexpanded conditon. The support comprises a pair of base members 17a, 17b, each being constituted by an oblong relatively thin (e.g., ⅛" or 0.3 cm.) plate having a flat substantially planar bottom face adapted for face-to-face engagement with the flat upwardly facing surface of rail 7, and a single support member 19 common to both base members. The support member 19 comprises a relatively thick (e.g., ¾" or 1.8 cm.) generally U-shaped plate having a pair of legs 19a, 19b defining a slot 21 therebetween. The legs 19a, 19b of the support member have a shape generally corresponding to the shape of the base members which are disposed immediately below the legs on opposite sides of slot 21. In its expanded condition, the flat substantially planar top face of the support member is adapted for face-to-face engagement with the flat downwardly facing surface of a mounting flange 9.

In accordance with this invention, the base members 17a, 17b and the support member 19 are connected by a pair of expansible annular members 23a, 23b, respectively, which are also oblong to have a shape generally corresponding to the shape of the base members and the legs 19a, 19b of the support member. Specifically, each annular member 23a, 23b is formed from relatively thin-gauge sheet metal (e.g., 0.040" or 0.10 cm. thick carbon steel having a relatively high tensile strength) and, as shown in FIG. 3, has an annular wall which is vertically compressed to assume a generally flattened condition wherein the wall is inwardly bent and generally U-shaped in vertical section. As shown in FIG. 3, the annular wall has a height equal to (but no greater than) the spacing between its respective base plate and the support member 19. The edge margins of the wall form end flanges 25 which are sealingly secured (e.g., welded) to a respective leg of the support member 19 and to a respective base member, the annular members, support member and base members thus combining to define a pair of expansible chambers designated 27a, and 27b. In its flattened (unexpanded) condition, the height of each annular member 23a, 23b is preferably about ¼" or 0.6 cm. It will be observed, therefore, that the expansible support 1 of this invention has a relatively thin profile, with the distance between the top and bottom faces of the base and support members being less than 2" (5.1 cm.) and preferably about ⅞" (2.2 cm.)

As illustrated in FIG. 4, the support member 19 has passaging therein for delivery of a pressurized hardenable fluid, such as a hardenable liquid epoxy resin, to the expansible chambers 27a, 27b, and for exit of air from the chambers as such fluid is introduced. This passaging comprises a first pair of bores 29, 31 extending between an edge 33 of the support member and the expansible chambers generally along the central longitutinal axes of the legs of the support member, and a second pair of bores 35, 37 angling between the expansible chambers and a recess or manifold 39 formed in the face of edge 33 midway between bores 29 and 31. The manifold is sealed closed at one side by an inset plate 41 set into the edge 33 of the support member. The bores 29, 31, 35 and 37 open into respective chambers 27a, 27b at locations adjacent the ends of the chambers nearest edge 33. Bores 29 and 37 may be referred to as first and second inlet passages for flow of fluid into expansible chambers 27a and 27b, respectively, and bores 35 and 31 may be referred to as first and second outlet passages for flow of fluid from expansible chambers 27a and 27b, respectively.

Hardenable fluid may be introduced into the expansible support to fill the chambers 27a, 27b by means of a piston-type hand pump (not shown) connected via a flexible hose 43 to a fitting 45 which may be threaded into one of the two bores 29 or 31. The fitting contains suitable valve means (e.g., a needle valve) which may be opened and closed by a handle 47 on the fitting. With the fitting 45 threaded in bore 29, for example, as shown in FIG. 4, fluid pumped into the system is adapted to flow through bore 29 (which thus constitutes a fluid inlet port) into chamber 27a, to fill that chamber, and then to flow through bore 35, manifold 39 and bore 37 into chamber 27b. Air displaced from the chambers 27a, 27b by the fluid exits bore 31 (which thus constitutes an air outlet port). A plug 51 is adapted to be threaded into bore 31 to close the outlet port once the chambers are purged of air (i.e., once they are filled). It will be understood that the above-described direction of flow can be reversed by using bore 31 as the inlet port and bore 29 as the outlet port, in which case chamber 27b would fill before chamber 27a. To avoid entrapment of air in the chambers 27a, 27b as they fill with hardenable fluid, the support 1 is preferably held in a vertical position with the outer (free) ends of the legs 19a, 19b of the support member 19 pointing down and edge 33 facing up so that the inlet and outlet ports 29, 31 are above the chambers. After the chambers are filled, which is evidenced by fluid oozing from the outlet port 31, the support is placed in position on a rail 7 below a respective mounting flange 9.

With the outlet port 31 closed by plug 51, further pressurization of the hardenable fluid in chambers 27a and 27b will cause the expansible annular members 23a, 23b to expand vertically from their flattened condition (FIG. 5) and the support member 19 to move upwardly into load-bearing engagement with the mounting flange 9 of the machine (FIG. 6). In the event the opposing bearing surfaces of the rail and mounting flange are not parallel, the relative flexibility of the annular members 23a, 23b will permit the top and bottom faces of the respective support and base members to move out of parallel with one another to ensure full face-to-face contact with such bearing surfaces. This is important for increasing the frictional resistance of the support 1 to gradual movement or creep from its intended position. To further maximize such frictional resistance, the base members 17a, 17b are sufficiently thin to enable them to deform so as to conform to any irregularities in the foundation (rail) bearing surface. Thus, as previously noted, each base member may be $\frac{1}{8}$" (0.3 cm.) thick for example.

Figure 7:
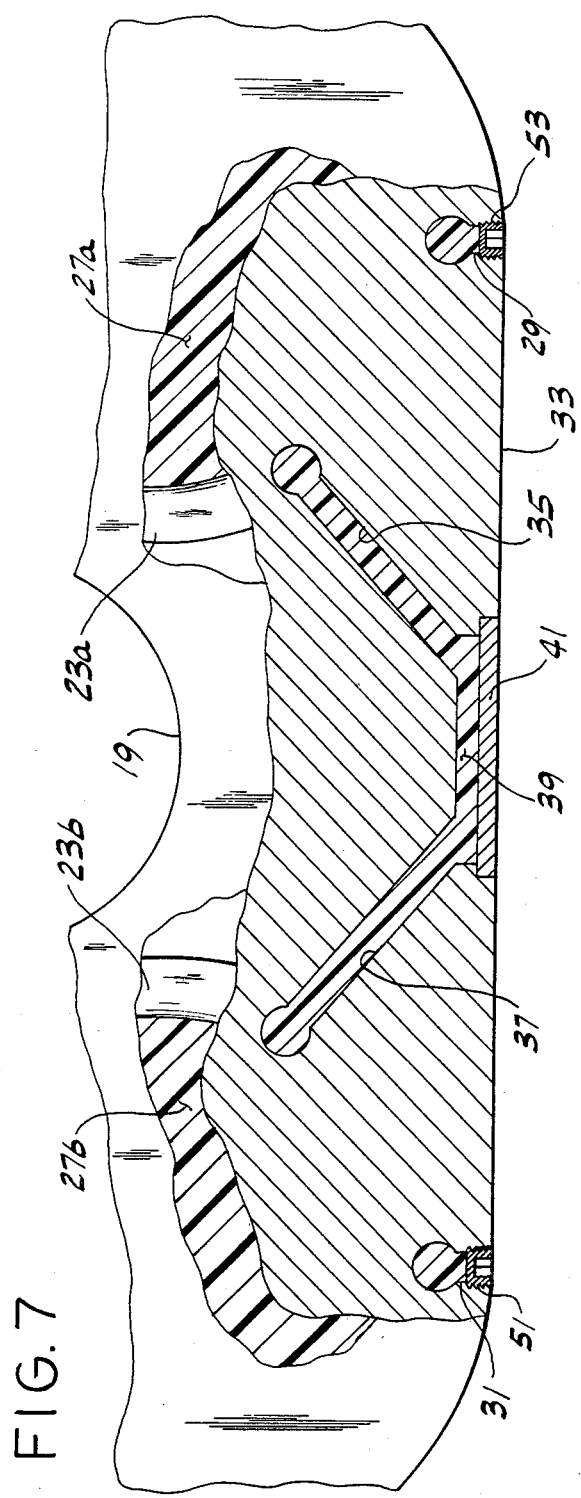
FIG. 7 is a view similar to FIG. 4 showing hardened epoxy in the passaging in the support.

After the fluid has hardened to fix the expansible support in position, the fitting 45 may be unthreaded from inlet bore 29 and replaced by a plug 53 (FIG. 7).

Figure 8:
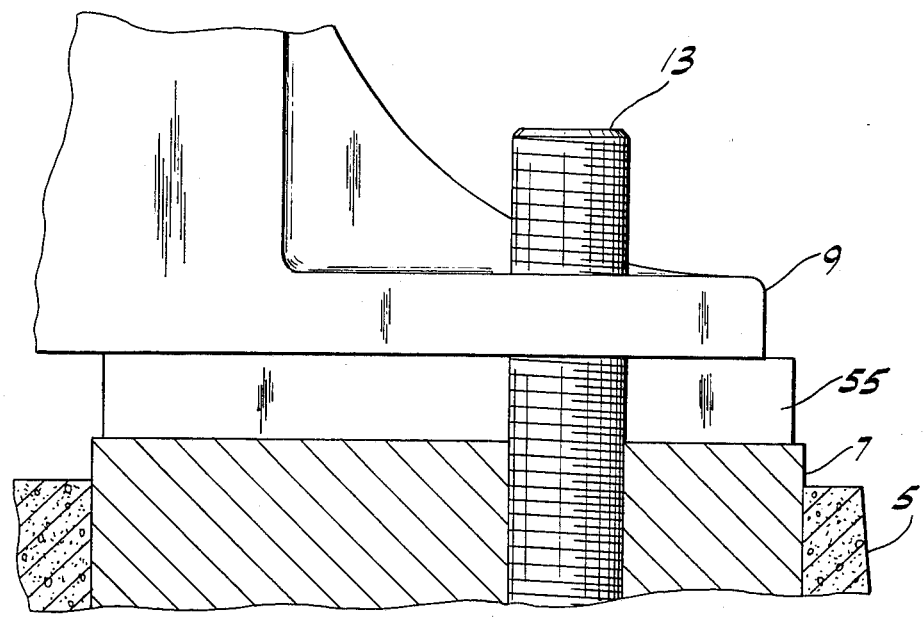
FIG. 8. is an elevational view showing the machine supported by a temporary support member.
Figure 9:
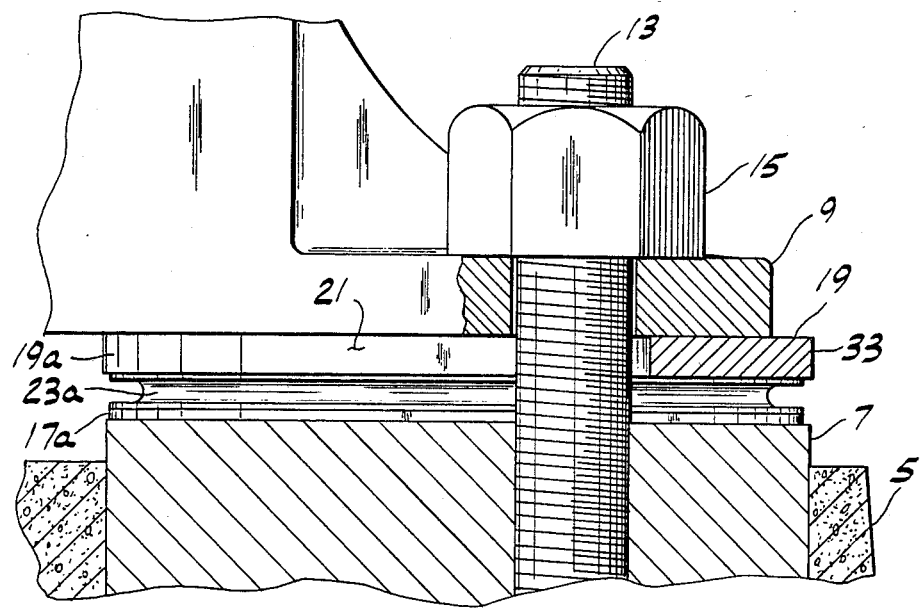
FIG. 9. is a view similar to FIG. 8 showing the machine supported by a support of the present invention.

A plurality of expansible supports 1 of the type discussed hereinabove may be used to support a machine on rails 7 in accordance with the method of this invention in the following manner:

The machine is first aligned by placing a plurality of temporary support members 55 (e.g., precision-machined shims or "chocks") between the rails 7 and the mounting flanges 9 of the machine temporarily to support the machine at a predetermined position in which the machine is properly aligned, the gap between the mounting flanges and the rails typically being about 1" (2.5 cm.), as shown in FIG. 8. An expansible support 1 is then prepared for use by threading fitting 45 into the inlet port 29, pumping a hardenable liquid epoxy resin into the support (while holding it vertical) until resin oozes from the outlet port 31 (thereby indicating that the two expansible chambers 27a, 27b are filled), and then closing the outlet port with plug 51.

After the support has been thus prepared, a temporary support member 55 at one location is removed (which may require raising the machine slightly and then lowering it back down onto the remaining temporary supports) and the expansible support placed in the vacated position by inserting it into the gap between the rail and the now unsupported mounting flange 9 to a position wherein the two base members 17a, 17b extend generally transversely with respect to the rail 7 and the anchor bolt 13 projects vertically between the base members and through the slot 21 in the support member 19 (FIG. 5). Additional hardenable epoxy resin is then introduced under pressure into the support to expand it vertically to bring the base members and support member into load-bearing engagement with the rail and mounting flange thereby to support the machine at the stated predetermined position (FIG. 6). To ensure that full load-bearing engagement is attained, the hardenable fluid is preferably pumped into the support until a pressure is reached sufficient to ensure bending of the relatively thin base members 17a, 17b to conform to any surface irregularities (e.g., waviness, depressions, etc.) in the rail 7. For base plates $\frac{1}{8}$" (0.3 cm.) thick, for example, the pressure should be about 400–600 psi. In the event the support expands at these pressures a distance sufficient to actually lift the machine to an elevation above the desired position, the nut 15 may be tightened down on the anchor bolt 13 to force the machine back precisely to the proper position (FIG. 8). With the machine thus properly positioned at that location, the valve in fitting 45 is closed by turning handle 47 to entrap the hardenable fluid in the support 1.

The total distance which the annular expansible members 23a, 23b expand during pressurization should be sufficiently small (e.g., $\frac{1}{4}$" or 0.6 cm.) to ensure that the annular wall of each member does not straighten entirely, for it is important that the wall have at least some inward bend (or U-shape) to resist the tendency of the wall to balloon outwardly under pressure.

With the valve in fitting 45 closed, the fluid in the support 1 is maintained under pressure until it hardens to fix the support in a position supporting the machine at that one location in the stated predetermined position. The fitting 45 is then unthreaded from inlet port 29 and replaced by a plug 53 similar to the plug 51 in the outlet port 31 (FIG. 7).

The above steps are repeated at each mounting flange 9 until every temporary support member is replaced by an expansible support of the present invention.

It will be understood that any suitable hardenable fluid may be used to expand support 1, such as an epoxy-resin-hardener blend which hardens substantially without expanding or contracting. For example, one such epoxy-resin-hardener is commercially available under the trade designation "Ceilcote No. 648" from Ceilcote Company, a unit of General Signal of Burea, Ohio. The epoxy resin and hardener are supplied in separate premeasured containers. When mixed, the blended material has a useable pot life of about 30 minutes, depending on ambient conditions (e.g., temperature). The cure time for the mixture is approximately 24 hours, although this too will vary depending on ambient conditions. The mixture exhibits no substantial change in volume as it cures and thus will maintain the expansible supports 1 in their expanded position for supporting the machine at the proper elevation.

For purposes of this description, the expansible support 1 and method of this invention have been shown as being useful in mounting a large industrial machine on rails 7 embedded in a concrete foundation. It will be understood, however, that this invention has other applications and that it may be used to support any type of large industrial equipment or object on other types of foundations. For example, the expansible supports may be used to "skid-mount" a machine on parallel I-beams. It will also be observed that an expansible support 1 of the present invention may take other forms or shapes.

In view of the above, it will be seen that the several objects of the invention are achieved and other advantageous results attained.

As various changes could be made in the above constructions and method without departing from the scope of the invention, it is intended that all matter contained in the above description or shown in the accompanying drawings shall be interpreted as illustrative and not in a limiting sense.

What is claimed is:

1. An expansible support adapted for supporting a heavy industrial machine or the like on a foundation, said support comprising a pair of base members having substantially planar bottom faces adapted for face-to-face engagement with a generally flat upwardly facing bearing surface on the foundation, a single support member spaced above the base members having a substantially planar top face adapted for face-to-face engagement with a generally flat downwardly-facing bearing surface on the machine, first and second relatively flat annular members connecting respective base members and the support member, said annular members being expansible for permitting relative movement of the support member away from the respective base members, said annular member, base members and support member combining to define first and second enclosed expansible chambers within respective annular members, and inlet port means communicating with said expansible chambers for delivery thereto of fluid under pressure, said support being adapted to be positioned between said foundation and machine bearing surfaces with the bottom faces of the base members resting on said foundation bearing surface and to have fluid then introduced under pressure via said inlet port means into said expansible chambers whereupon said annular members are adapted to expand and the support member to move upwardly relative to the base members thereby to bring the top and bottom faces of the respective members into load-bearing contact with said bearing surfaces, said annular members being adapted for permitting the top and bottom faces of the respective base and support members to move out of parallel with respect to one another for full face-to-face contact with nonparallel bearing surfaces, said support member having a slot therein for receiving an anchor bolt when the support is placed between the foundation and the machine, said base members and associated annular members being connected to the support member on opposite sides of the slot, said inlet port means comprising inlet passages in said support plate, and outlet port means comprising outlet passages for exit of air from respective first and second chambers as fluid is introduced into the chambers, said inlet passage of said second expansible chamber being in fluid communication with said outlet passage of said first expansible chamber for flow of fluid from said first chamber when it is filled to said second chamber to fill the second chamber.

2. An expansible support as set forth in claim 1 wherein each base member comprises a metal plate sufficiently thin to enable it to bend to conform to irregularities in the foundation bearing surface.

3. An expansible support as set forth in claim 1 wherein the inlet passage of said first expansible member is constituted by a bore extending inwardly from an edge of the support member to said first expansible chamber.

4. An expansible supoort as set forth in claim 1 wherein the outlet passage of said second expansible member is constituted by a bore in the support member extending between said second chamber and an edge of the member.

5. An expansible support as set forth in claim 1 wherein each annular member has an annular wall compressed in the vertical direction to assume a generally flattened condition, said wall being adapted to expand generally vertically from said flattened condition when pressurized fluid is introduced into said chamber.

6. An expansible support as set forth in claim 5 wherein said annular wall has edge margins forming end flanges secured to said base and support members.

7. An expansible support as set forth in claim 6 wherein said annular member is formed from relatively thin-gauge sheet metal.

8. An expansible support as set forth in claim 7 wherein said wall is inwardly bent and generally U-shaped in section.

9. An expansible support as set forth in claim 8 wherein said annular member is oblong.

10. An expansible support as set forth in claim 1 wherein the distance between the top and bottom faces of the base and support members is less than 2" prior to expansion of said annular member.

* * * * *